United States Patent
Hirota et al.

(10) Patent No.: US 9,847,688 B2
(45) Date of Patent: Dec. 19, 2017

(54) ROTARY ELECTRIC MACHINE STATOR AND ROTARY ELECTRIC MACHINE

(71) Applicants: Yutaka Hirota, Chiyoda-ku (JP); Akira Hashimoto, Chiyoda-ku (JP); Kazuhiko Boku, Chiyoda-ku (JP)

(72) Inventors: Yutaka Hirota, Chiyoda-ku (JP); Akira Hashimoto, Chiyoda-ku (JP); Kazuhiko Boku, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 476 days.

(21) Appl. No.: 14/433,756

(22) PCT Filed: Nov. 14, 2012

(86) PCT No.: PCT/JP2012/079543
§ 371 (c)(1),
(2) Date: Apr. 6, 2015

(87) PCT Pub. No.: WO2014/076783
PCT Pub. Date: May 22, 2014

(65) Prior Publication Data
US 2015/0280508 A1 Oct. 1, 2015

(51) Int. Cl.
*H02K 3/00* (2006.01)
*H02K 3/32* (2006.01)
(Continued)

(52) U.S. Cl.
CPC .......... *H02K 3/325* (2013.01); *H02K 3/345* (2013.01); *H02K 3/522* (2013.01); *H02K 15/10* (2013.01); *H02K 2203/12* (2013.01)

(58) Field of Classification Search
CPC .......... H02K 3/30; H02K 3/325; H02K 3/32; H02K 3/34; H02K 3/345; H02K 3/50;
(Continued)

(56) References Cited

U.S. PATENT DOCUMENTS

| | | | | |
|---|---|---|---|---|
| 5,763,978 A | * | 6/1998 | Uchida | H02K 3/325 310/214 |
| 6,414,413 B1 | * | 7/2002 | Arai | H02K 1/146 29/596 |

(Continued)

FOREIGN PATENT DOCUMENTS

| JP | 2002 171704 | | 6/2002 | |
|---|---|---|---|---|
| JP | 2002171704 | * | 6/2002 | H02K 3/34 |

(Continued)

OTHER PUBLICATIONS

JP 2002171704 English Translation.*
(Continued)

*Primary Examiner* — Michael Andrews
*Assistant Examiner* — Maged Almawri
(74) *Attorney, Agent, or Firm* — Oblon, McClelland, Maier & Neustadt, L.L.P.

(57) ABSTRACT

An insertion groove is disposed on a tubular portion overlapping portion that is overlapped with an inner circumferential surface of a tubular portion of the stator core. Intercoil insulating bodies that are disposed between a plurality of stator coils include a groove inserted portion. The groove inserted portion includes: a first inserted portion that can be inserted inside the insertion groove when the insulating film is in a bent and folded state; and a second inserted portion that is contiguous to the first inserted portion, a shape of a visible outline of a cross section of the second inserted portion being different than that of the first inserted portion. The second inserted portion generates a stronger elastic force of recovery than the first inserted portion when the groove inserted portion is inserted into the insertion groove.

7 Claims, 10 Drawing Sheets

(51) Int. Cl.
*H02K 3/34* (2006.01)
*H02K 3/52* (2006.01)
*H02K 15/10* (2006.01)

(58) Field of Classification Search
CPC .......... H02K 3/42; H02K 3/521; H02K 3/522; H02K 3/525; H02K 3/527; H02K 3/52; H02K 15/10; H02K 15/105; H02K 2203/12
USPC .................................... 310/214, 215; 29/596
See application file for complete search history.

(56) References Cited

U.S. PATENT DOCUMENTS

| 8,981,614 | B2 * | 3/2015 | Oka ....................... | H02K 3/325 |
| | | | | 310/214 |
| 2011/0148244 | A1 * | 6/2011 | Bliemeister ............. | H02K 3/38 |
| | | | | 310/215 |
| 2012/0326550 | A1 * | 12/2012 | Kinpara ................ | H02K 21/14 |
| | | | | 310/156.54 |

FOREIGN PATENT DOCUMENTS

| JP | 2002 233092 | | 8/2002 | |
| JP | 2002233092 | * | 8/2002 | ............... H02K 3/34 |
| JP | 2006 115563 | | 4/2006 | |
| JP | WO2012169059 | * | 12/2012 | ............... H02K 3/34 |
| WO | 2012 169059 | | 12/2012 | |

OTHER PUBLICATIONS

JP 2002233092 English Translation.*
WO2012169059 English Translation.*
International Search Report dated Feb. 19, 2013 in PCT/JP12/079543 Filed Nov. 14, 2012.

* cited by examiner

ROTARY ELECTRIC MACHINE STATOR AND ROTARY ELECTRIC MACHINE

TECHNICAL FIELD

The present invention relates to a rotary electric machine stator that is included in an inner-rotor rotary electric machine, and to a rotary electric machine.

BACKGROUND ART

Conventionally, in order to ensure an insulated state between two windings on mutually adjacent stator teeth that are each wound so as to have a bobbin interposed, salient-pole concentrated-winding electric motors are known in which a gap is disposed between flange end portions of the bobbins and an inner circumferential surface of the stator core main body, a flange portion of an insulating material that has a T-shaped cross section is sandwiched in the gap and held, and a central portion of the insulating material is disposed between the two windings (see Patent Literature 1).

CITATION LIST

Patent Literature

[Patent Literature 1]
Japanese Patent Laid-Open No. 2002-171704 (Gazette)

SUMMARY OF THE INVENTION

Problem to be Solved by the Invention

However, in conventional salient-pole concentrated-winding electric motors, if dimensions of the flange portion of the insulating material are increased in order to ensure that the flange portion of the insulating material is reliably held in the gap between the bobbins and the stator core main body, it becomes difficult to insert the flange portion of the insulating material into the gap between the bobbins and the stator core main body. Alternatively, if the dimensions of the flange portion of the insulating material are reduced to make it easy to insert the flange portion of the insulating material into the gap between the bobbins and the stator core main body, the holding force on the flange portion of the insulating material in the gap between the bobbins and the stator core main body becomes weak. Consequently, the insulating material is more likely to become misaligned or dislodge from the stator core main body, and there is a risk that the insulated state between the respective windings cannot be ensured.

The present invention aims to solve the above problems and an object of the present invention is to provide a rotary electric machine stator and rotary electric machine that can facilitate manufacturing and that can also ensure an insulated state between a plurality of stator coils more reliably.

Means for Solving the Problem

In order to achieve the above object, according to one aspect of the present invention, there is provided a rotary electric machine stator including: a stator core including: a tubular portion; and a plurality of magnetic pole tooth portions that are disposed so as to each protrude radially inward from the tubular portion so as to be spaced apart from each other in a circumferential direction of the tubular portion, the magnetic pole tooth portions surrounding an outer circumference of a rotor; a plurality of stator coils that are respectively disposed on the magnetic pole tooth portions; a coil-core insulating body that has a tubular portion overlapping portion that overlaps with an inner circumferential surface of the tubular portion, the coil-core insulating body ensuring an insulated state between the stator coil and the stator core; and an inter-coil insulating body that is formed by bending an insulating film, and that is disposed between the stator coils so as to ensure an insulated state between the stator coils, wherein: an insertion groove that is open toward a radially inner side of the stator core is disposed parallel to an axial direction of the stator core on the tubular portion overlapping portion; the inter-coil insulating body includes a groove inserted portion that generates an elastic force of recovery so as to be held inside the insertion groove by being inserted into the insertion groove parallel to a longitudinal direction of the insertion groove; the groove inserted portion includes: a first inserted portion that can be inserted inside the insertion groove from a longitudinal end portion of the insertion groove when the insulating film is in a bent and folded state; and a second inserted portion that is contiguous to the first inserted portion in a direction in which the groove inserted portion is inserted into the insertion groove, a shape of a visible outline of a cross section of the second inserted portion being different than that of the first inserted portion; and the second inserted portion generates a stronger elastic force of recovery than the first inserted portion when the groove inserted portion is inserted into the insertion groove.

Effects of the Invention

According to the rotary electric machine stator according to the present invention, inter-coil insulating bodies can easily be mounted into a stator core, enabling manufacturing of the stator to be facilitated. The holding force on the groove inserted portion inside the insertion groove can be increased by the elastic force of recovery of the second inserted portion, enabling the inter-coil insulating bodies to be more reliably mounted to the stator core. An insulated state among the plurality of stator coils 8 can thereby be more reliably ensured.

DESCRIPTION OF EMBODIMENTS

A preferred embodiment of the present invention will now be explained with reference to the drawings.

Embodiment 1

Figure 1:
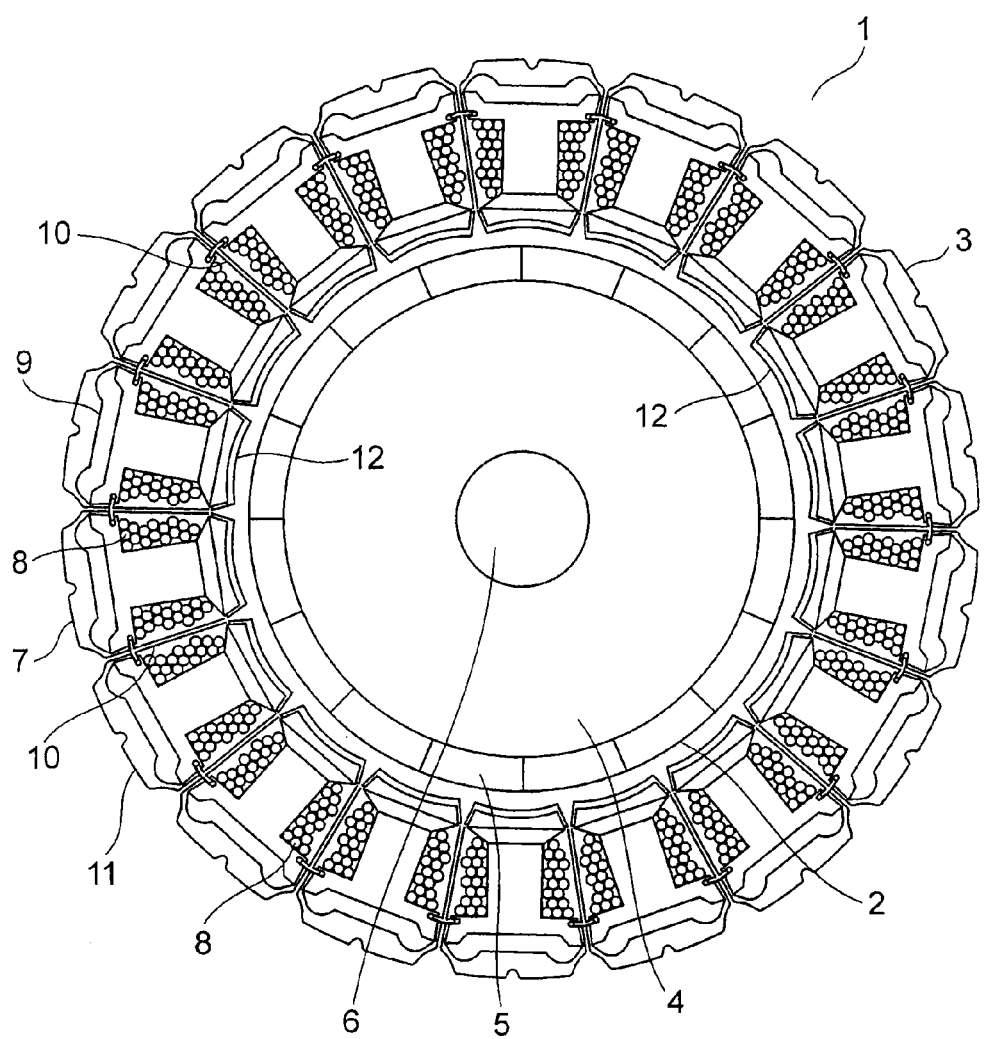
FIG. 1 is a front elevation that shows a rotary electric machine according to Embodiment 1 of the present invention.

FIG. 1 is a front elevation that shows a rotary electric machine according to Embodiment 1 of the present invention. In the figure, a rotary electric machine 1 that is used as a motor or a generator has: a rotor 2; and a cylindrical stator 3 that surrounds an outer circumference of the rotor 2. In other words, the rotary electric machine 1 functions as an inner-rotor rotary electric machine.

The rotor 2 is rotatable around the shaft axis of the rotary electric machine 1 relative to the stator 3. The rotor 2 has: a cylindrical rotor core 4 that is configured by laminating a plurality of steel plates in an axial direction; a plurality of permanent magnets 5 that are fixed to an outer circumferential surface of the rotor core 4 so as to be lined up in a circumferential direction of the rotor core 4; and a rotor shaft 6 that is disposed on the shaft axis of the rotary electric machine 1, and that is fixed to the rotor core 4 so as to pass through a center of the rotor core 4.

The stator 3 is disposed so as to be coaxial with the rotor 2. The stator 3 has: a stator core 7 that surrounds the outer circumference of the rotor 2; a plurality of stator coils 8 that are disposed on the stator core 7 so as to be lined up in a circumferential direction of the stator core 7; resin coil-core insulating bodies 9 that are disposed on the stator core 7 so as to ensure an insulated state between each of the stator coils 8 and the stator core 7; and a plurality of resin inter-coil insulating bodies 10 that are disposed between the stator coils 8 so as to ensure an insulated state between the stator coils 8.

Figure 2:
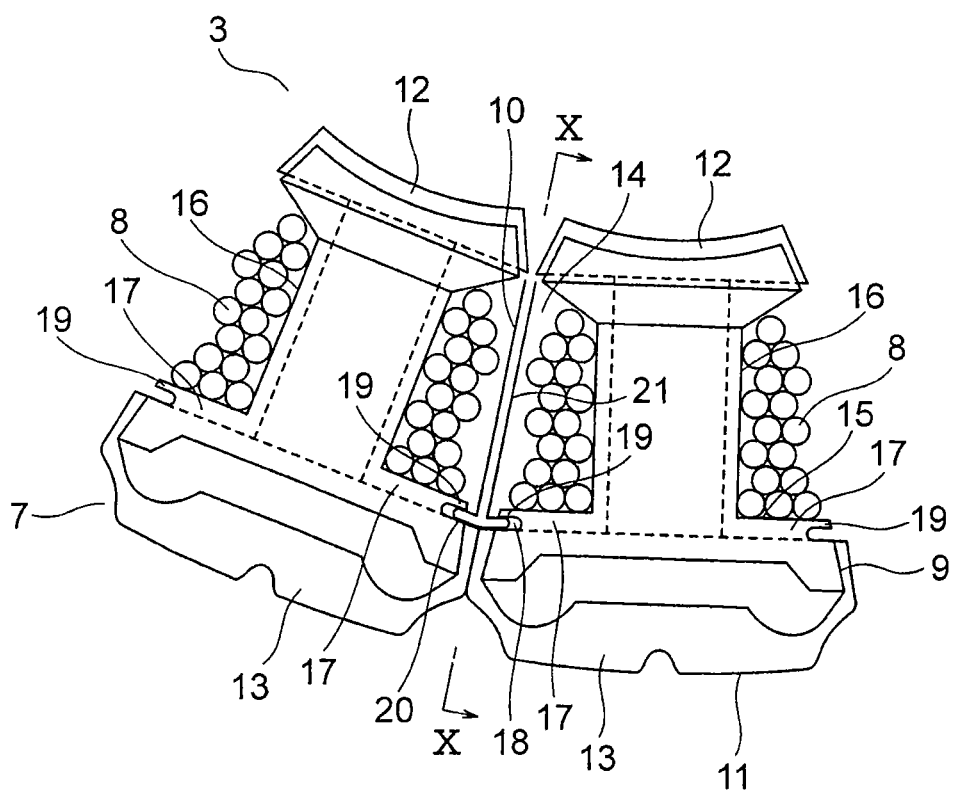
FIG. 2 is an enlargement that shows part of a stator from FIG. 1.

FIG. 2 is an enlargement that shows part of the stator 3 from FIG. 1. In the figure, the stator core 7 has: a tubular portion 11 that is formed so as to have a cylindrical shape; and a plurality of magnetic pole tooth portions 12 that are disposed so as to respectively protrude radially inward from the tubular portion 11 so as to be spaced apart from each other in the circumferential direction of the tubular portion 11. The stator core 7 is a laminated body in which a plurality of steel plates are stacked in an axial direction.

The tubular portion 11 has a plurality of core back segments 13 that are lined up in a circumferential direction of the stator core 7 so as to be linked pivotably to each other.

One of the plurality of magnetic pole tooth portions 12 is disposed individually on each of the core back segments 13. Spaces that exist between each of the magnetic pole tooth portions 12 constitute slots (coil grooves) 14 in which conducting wires that constitute the stator coils 8 are disposed. The stator coils 8 are disposed on each of the magnetic pole tooth portions 12 individually by winding the conducting wires into concentrated windings on the magnetic pole tooth portions 12.

The coil-core insulating bodies 9 are interposed between each of the stator coils 8 and the stator core 7. The coil-core insulating bodies 9 have: a tubular portion overlapping portion 15 that overlaps with an inner circumferential surface of the tubular portion 11; and a plurality of tooth overlapping portions 16 that overlap with side surfaces of the magnetic pole tooth portions 12. The tubular portion overlapping portions 15 are constituted by a plurality of core back segment overlapping portions that respectively overlap with each of the core back segments 13.

A plurality of insertion grooves 18 that are open toward a radially inner side of the stator core 7 are disposed on the tubular portion overlapping portions 15 parallel to the axial direction of the stator core 7. The insertion grooves 18 are respectively disposed at intermediate positions between each of the magnetic pole tooth portions 12. The insertion grooves 18 are respectively formed between the core back segment overlapping portions 17 that overlap with each of the mutually adjacent core back segments 13.

Portions of the core back segment overlapping portions 17 protrude from side surfaces of the insertion grooves 18 toward each other while forming a gap away from the bottom surfaces of the insertion grooves 18 to constitute restricting portions 19. The open portions of the insertion grooves 18 are flanked on two sides by the respective restricting portions 19 of mutually adjacent core back segment overlapping portions 17. A width dimension of the open portions of the insertion grooves 18 is thereby narrower than a width dimension inside the insertion grooves 18. In this example, bottom surfaces of the insertion grooves 18 are formed by inner circumferential surfaces of the core back segments 13 (inner circumferential surfaces of the tubular portion 11). Furthermore, in this example, a cross-sectional shape of the insertion grooves 18 is a flat shape that has a smaller depth dimension than a width dimension.

The inter-coil insulating bodies 10 have: a groove inserted portion 20 that is inserted into the insertion grooves 18 parallel to a longitudinal direction of the insertion grooves 18; and partitioning portions 21 that extend inward in the radial direction of the stator core 7 from the groove inserted portion 20 to form a partition in a space between mutually adjacent stator coils 8. The groove inserted portions 20 are held inside the insertion grooves 18 by being deformed elastically while being inserted inside the insertion grooves 18 to generate an elastic force of recovery. When the groove inserted portions 20 are inserted inside the insertion grooves 18, a width dimension of the partitioning portions 21 is smaller than the width dimension of the open portions of the insertion grooves 18, and a width dimension of the groove inserted portions 20 is greater than the width dimension of the open portions of the insertion grooves 18. Due to the groove inserted portions 20 inside the insertion grooves 18 being engaged with the pairs of restricting portions 19, the inter-coil insulating bodies 10 are configured so as to not to disengage from the insertion grooves 18 inward in the radial direction of the stator core 7.

Figure 3:
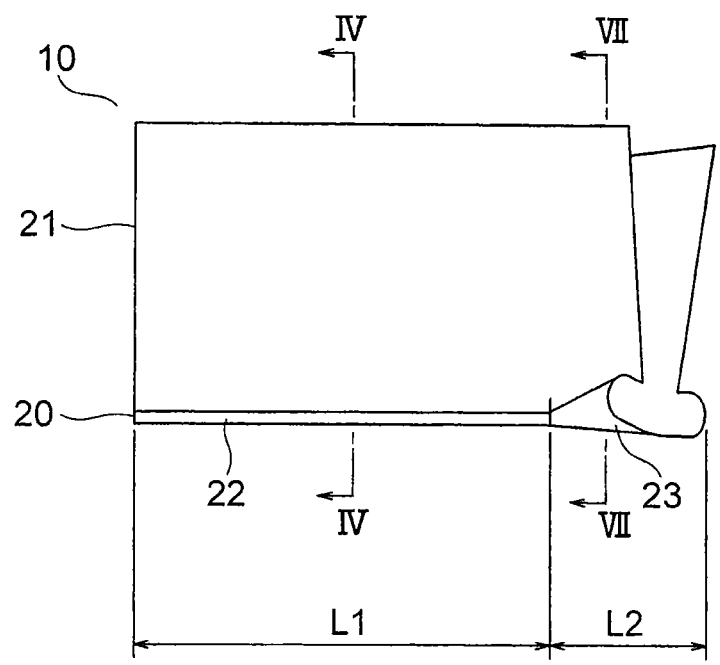
FIG. 3 is an oblique projection that shows an inter-coil insulating body from FIG. 2.

FIG. 3 is an oblique projection that shows the inter-coil insulating body 10 from FIG. 2. The inter-coil insulating bodies 10 are formed by bending an insulating film such that a space is formed internally. In this example, a pair of facing portions that face each other are formed as partitioning portions 21, and an expanded portion that has a width dimension that is larger than a distance between the pair of facing portions is formed as the groove inserted portion 20, by bending one sheet of insulating film.

The groove inserted portions 20 have: a first inserted portion 22; and a second inserted portion 23 that continues from the first inserted portion 22 in a direction in which the groove inserted portions 20 are inserted into the insertion grooves 18 (the longitudinal direction of the insertion grooves 18). A shape of a visible outline of a cross section of the first inserted portion 22 and a shape of a visible outline of a cross section of the second inserted portion 23 (specifically, the shapes of the respective visible outlines of the first inserted portion 22 and the second inserted portion 23 in a cross section that is perpendicular to the longitudinal direction of the insertion grooves 18) are mutually different. Furthermore, when the groove inserted portions 20 are outside the insertion grooves 18, an area that is surrounded by the visible outline of the cross section of the second inserted portion 23 expands continuously away from the first inserted portion 22 in the longitudinal direction of the insertion grooves 18. In this example, a longitudinal dimension L1 of the first inserted portion 22 is greater than a longitudinal dimension L2 of the second inserted portion 23 in the direction in which the groove inserted portions 20 are inserted into the insertion grooves 18.

Figure 4:
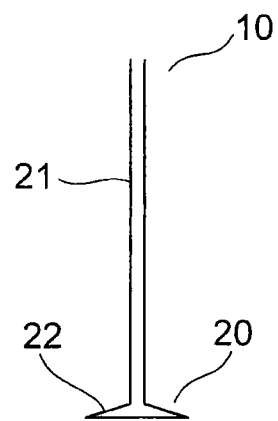
FIG. 4 is a cross section that is taken along Line IV-IV in FIG. 3.

FIG. 4 is a cross section that is taken along Line IV-IV in FIG. 3. The first inserted portion 22 is formed by bending and folding the insulating film along folds. Thus, the shape of the visible outline of the cross section of the first inserted portion 22 is an approximately triangular shape that has: a base side; and two oblique sides that extend from two end portions of the base side so as to be inclined, and that respectively connect to the pair of facing portions of the partitioning portions 21. A side of the first inserted portion 22 near the partitioning portions 21 is open internally. The state of the first inserted portion 22 becomes a folded state in which the cross sectional area is reduced by bending and folding the insulating film in a direction in which the two oblique sides approach the base side while elastically deforming it.

Figure 5:
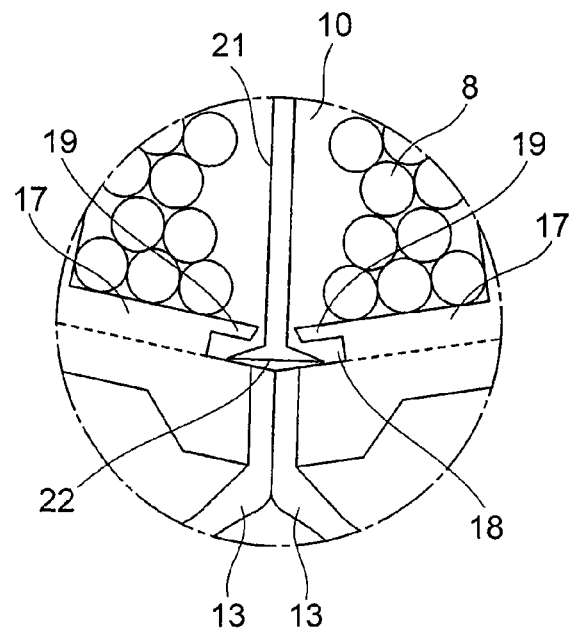
FIG. 5 is a partial front elevation that shows a state in which a first inserted portion from FIG. 4 is inserted into an insertion groove from FIG. 2 while keeping the first inserted portion in a folded state.

FIG. 5 is a partial front elevation that shows a state in which the first inserted portion 22 from FIG. 4 is inserted into the insertion groove 18 from FIG. 2 while keeping the first inserted portion 22 in a folded state. As shown in FIG. 5, when the state of the first inserted portion 22 is the folded state, the first inserted portion 22 is a size that can fit inside a cross sectional area of the insertion groove 18. Consequently, the first inserted portion 22 is insertable inside the insertion groove 18 from a longitudinal end portion of the insertion groove 18 (an insertion aperture of the insertion groove 18) when in the folded state.

Figure 6:
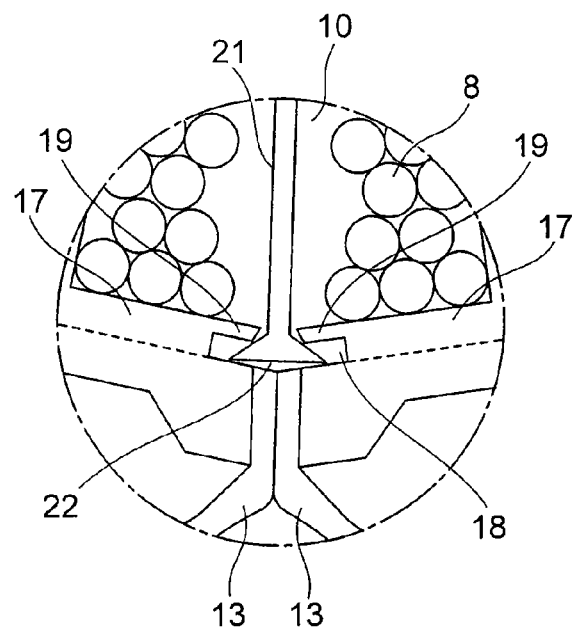
FIG. 6 is a partial front elevation that shows a state in which the folded state of the first inserted portion in FIG. 5 is released when the first inserted portion is inserted inside the insertion groove.

FIG. 6 is a partial front elevation that shows a state in which the folded state of the first inserted portion 22 in FIG. 5 is released when the first inserted portion 22 is inserted inside the insertion groove 18. When the folded state of the first inserted portion 22 is released by removing the force that bends and folds the insulating film, the cross sectional area of the first inserted portion 22 expands as the insulating film is restored elastically. Consequently, if the folded state of the first inserted portion 22 is released when the first inserted portion 22 is inserted inside the insertion groove 18, as shown in FIG. 6, the first inserted portion 22 enters a state in which pressure is applied to the inner surfaces of the insertion groove 18 by the elastic force of recovery of the insulating film. Thus, the first inserted portion 22 that has its folded state released inside the insertion groove 18 is held inside the insertion groove 18 by the elastic force of recovery of the insulating film.

Figure 7:
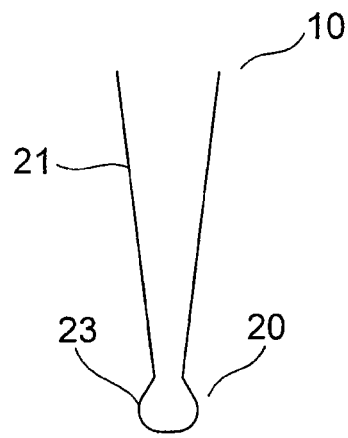
FIG. 7 is a cross section that is taken along Line VII-VII in FIG. 3.

FIG. 7 is a cross section that is taken along Line VII-VII in FIG. 3. The second inserted portion 23 is formed by bending the insulating film. A shape of a visible outline of a cross section of the second inserted portion 23 is an approximate C shape that is open toward the partitioning portions 21 when the groove inserted portions 20 are outside inside the insertion grooves 18. A fold may also be formed on the insulating film in the second inserted portion 23, but it is difficult to place the second inserted portion 23 in a folded state by bending and folding the insulating film as in the first inserted portion 22. In this example, a maximum dimension of the second inserted portion 23 in a depth direction of the insertion groove 18 is greater than a maximum dimension of the first inserted portion 23 in the depth direction of the insertion groove 18 when the groove inserted portion 20 is outside the insertion groove 18.

Figure 8:
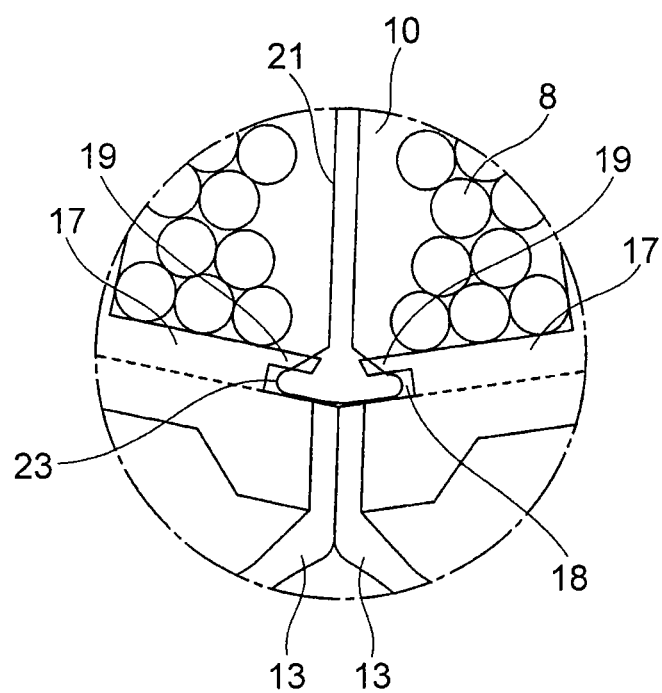
FIG. 8 is a partial front elevation that shows a state in which a second inserted portion from FIG. 7 is outside the insertion groove.

FIG. 8 is a partial front elevation that shows a state in which a second inserted portion 23 from FIG. 7 is outside the insertion groove 18. At least a portion of a visible outline of a cross section of the second inserted portion 23 extends outside the cross sectional area of the insertion groove 18 when the second inserted portion 23 is outside the insertion groove 18. The second inserted portion 23 is inserted inside the insertion groove 18 by being deformed elastically so as to fit inside the cross sectional area of the insertion groove 18 while being guided by inner surfaces of the insertion groove 18.

Figure 9:
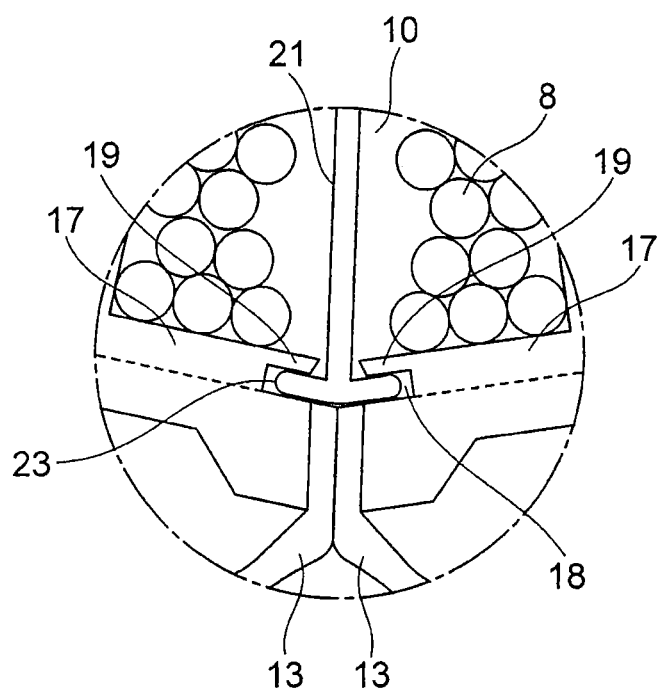
FIG. 9 is a partial front elevation that shows a state in which the second inserted portion from FIG. 8 is inserted inside the insertion groove.

FIG. 9 is a partial front elevation that shows a state in which the second inserted portion 23 from FIG. 8 is inserted inside the insertion groove 18. When the second inserted portion 23 is inserted inside the insertion groove 18, the second inserted portion 23 enters a state in which pressure is applied to the inner surfaces of the insertion groove 18 by the elastic force of recovery of the insulating film. Thus, the second inserted portion 23 is held inside the insertion groove 18 with pressure being applied to the inner surfaces of the insertion groove 18 by the elastic force of recovery of the insulating film. When the groove inserted portion 20 is inserted inside the insertion groove 18, the second inserted portion 23 generates a stronger elastic force of recovery than the first inserted portion 22 due to the second inserted portion 23 being elastically deformed more than the first inserted portion 22 by being pressed against the inner surfaces of the insertion groove 18. The groove inserted portion 20 is held inside the insertion groove 18 by the respective elastic forces of recovery of the first inserted portion 22 and the second inserted portion 23.

The rotary electric machine 1 is manufactured by inserting the rotor 2 inside the stator 3 after the rotor 2 and the stator 3 are respectively produced.

Next, a method for manufacturing the stator 3 will be explained. A partially formed core body that later becomes the stator core 7 is first produced by laminating a plurality of steel plates that have been punched into predetermined shapes. In the partially formed core body, a plurality of core back segments 13 are linked pivotably in succession without being linked into a tubular shape, and the magnetic pole tooth portions 12 respectively protrude from each of the core back segments 13.

Next, the partially formed core body is opened out in a direction in which distances between each of the magnetic pole tooth portions 12 are spread out, and the coil-core insulating bodies 9 are disposed on the partially formed core body by disposing an insulating layer on side surfaces of each of the magnetic pole tooth portions 12 and on surfaces of each of the core back segments 13 near the magnetic pole tooth portions 12. The insulating layers that overlap with the side surfaces of the magnetic pole tooth portions 12 are the tooth overlapping portions 16, and the insulating layers that overlap with the core back segments 13 are the core back segment overlapping portions 17. The coil-core insulating bodies 9 are disposed on the partially formed core body by resin molding.

Next, the stator coils 8 are disposed on each of the magnetic pole tooth portions 12 so as to have the coil-core insulating bodies 9 interposed by winding conducting wires onto the magnetic pole tooth portions 12 using a winding machine.

Next, the partially formed core body is made into a tubular stator core 7 by bending and rolling up the partially formed core body and linking the end portions of the partially formed core body to each other. The insertion grooves 18 are thereby formed between the mutually adjacent core back segment overlapping portions 17. Moreover, the stator core 7 may be formed by bending a single partially formed core body, or may be formed by assembling a plurality of bent partially formed core bodies.

Next, groove inserted portions 20 of inter-coil insulating bodies 10 that have been produced in advance by bending an insulating film are inserted inside the insertion grooves 18 such that the groove inserted portions 20 are held inside the insertion grooves 18. The inter-coil insulating bodies 10 are thereby mounted to the stator core 7. The stator 3 is produced in this manner.

Figure 10:
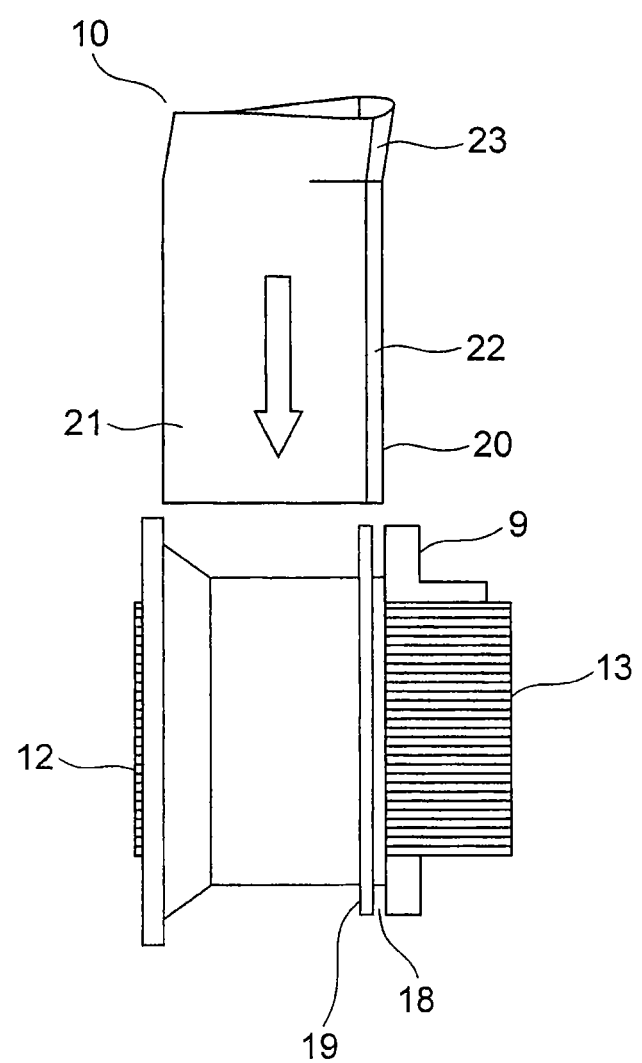
FIG. 10 is a cross section that is taken along Line X-X in FIG. 2 in a state before the inter-coil insulating body from FIG. 2 is mounted to a stator core.
Figure 11:
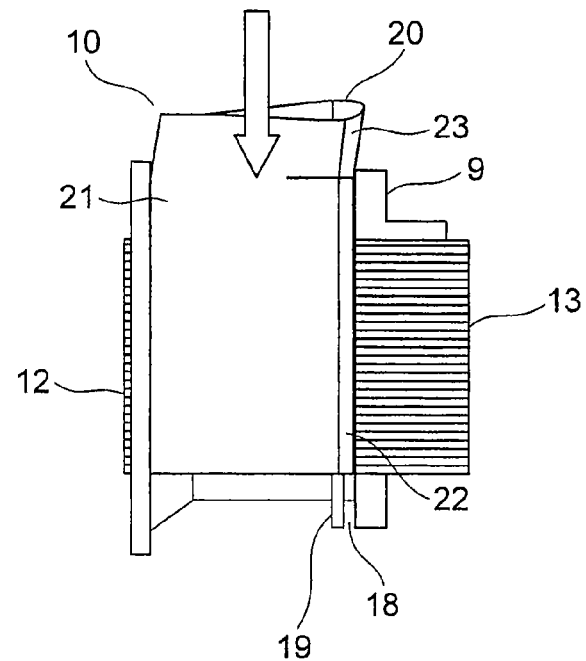
FIG. 11 is a cross section that shows a state in which only the first inserted portion among the first inserted portion and the second inserted portion from FIG. 10 is inserted inside the insertion groove.
Figure 12:
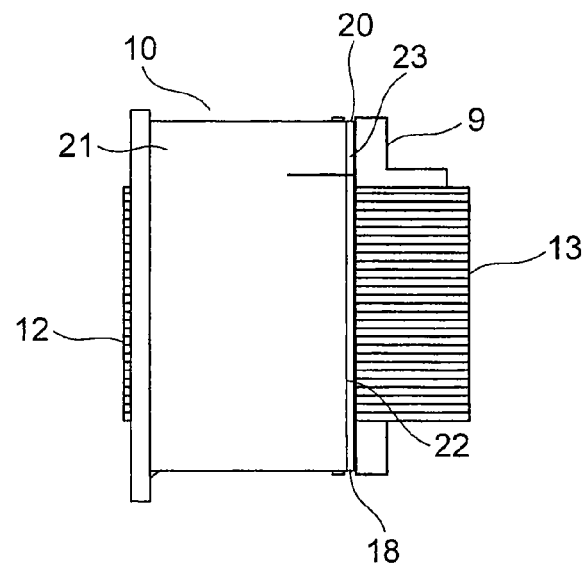
FIG. 12 is a cross section that shows a state in which the first inserted portion and the second inserted portion from FIG. 11 are inserted inside the insertion groove.

Next, a method for mounting the inter-coil insulating bodies 10 to the stator core 7 will be explained. FIG. 10 is a cross section that is taken along Line X-X in FIG. 2 in a state before the inter-coil insulating body 10 from FIG. 2 is mounted to the stator core 7. FIG. 11 is a cross section that shows a state in which only the first inserted portion 22 among the first inserted portion 22 and the second inserted portion 23 from FIG. 10 is inserted inside the insertion groove 18. In addition, FIG. 12 is a cross section that shows a state in which the first inserted portion 22 and the second inserted portion 23 from FIG. 11 are inserted inside the insertion groove 18. Moreover, for simplicity, the stator coils 8 are omitted in FIGS. 10 through 12.

When mounting the inter-coil insulating bodies 10 to the stator core 7, a bottom portion of an end portion of the first inserted portion 22 is first pressed against the bottom surface of the insertion groove 18 at the longitudinal end portion of the insertion groove 18 (the insertion aperture of the insertion groove 18) while holding a pair of facing portions of the partitioning portions 21. The insulating film of the first inserted portion 22 is thereby bent and folded while deforming elastically such that the state of the first inserted portion 22 enters the folded state. Next, as shown in FIG. 10, the end portion of the first inserted portion 22 that is in the folded state is inserted inside the insertion groove 18 from the insertion aperture of the insertion groove 18. Next, as shown in FIG. 11, the inter-coil insulating bodies 10 is slid parallel to the longitudinal direction of the insertion groove 18 while inserting the first inserted portion 22 inside the insertion groove 18.

Next, as shown in FIG. 11, the second inserted portion 23 is inserted inside the insertion groove 18 after the first inserted portion 22. The groove inserted portion 20 is thereby inserted inside the insertion groove 18. When the second inserted portion 23 is inserted inside the insertion groove 18, the second inserted portion 23 is elastically deformed so as to fit into the cross sectional area of the insertion groove 18 as the second inserted portion 23 is guided by an inner surface of the insertion aperture of the insertion groove 18. A strong elastic force of recovery is generated in the second inserted portion 23 thereby. Here, because the area that is surrounded by the visible outline of the cross section of the second inserted portion 23 expands continuously away from the first inserted portion 22, the magnitude of the force required to insert the second inserted portion 23 inside the insertion groove 18 (the insertion force) increases continuously as the amount of insertion of the second inserted portion 23 into the insertion groove 18 is increased, and becomes constant after the entire second inserted portion 23 is inserted inside the insertion groove 18. Consequently, switching over of the magnitude of the insertion force of the second inserted portion 23 from a continuously increasing state to becoming constant can be used as a guide (a reference) to determine the inserted position of the groove inserted portion 20 in the insertion groove 18.

When the groove inserted portion 20 is inserted inside the insertion groove 18, the folded state of the first inserted portion 22 is released, and the groove inserted portion 20 is held inside the insertion groove 18 by the respective elastic forces of recovery of the first and second inserted portions 22 and 23. The inter-coil insulating bodies 10 are mounted into the stator core 7 by the groove inserted portions 20 being held inside the insertion grooves 18.

Figure 13:
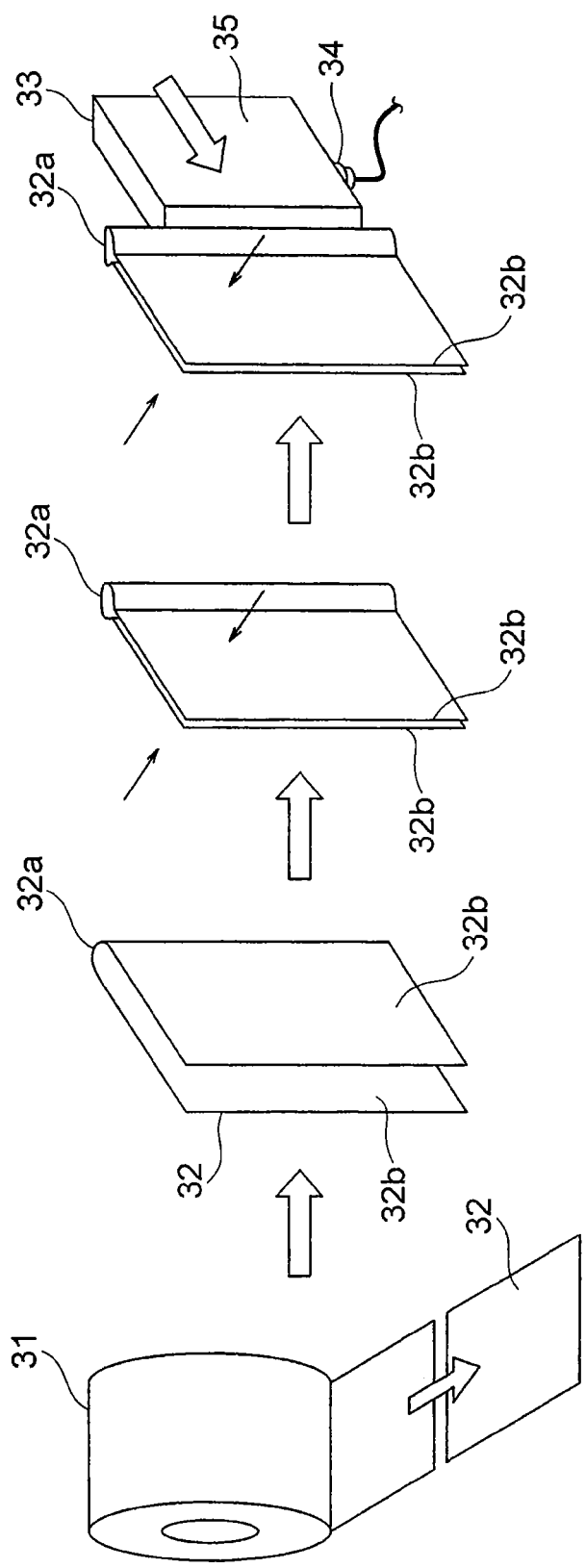
FIGS. 13(a) through 13(d) are explanatory diagrams that explain a method for manufacturing the inter-coil insulating body from FIG. 3.

Next, a method for manufacturing the inter-coil insulating bodies 10 will be explained. FIGS. 13(a) through 13(d) are explanatory diagrams that explain the method for manufacturing the inter-coil insulating body 10 from FIG. 3, FIG. 13(a) being an oblique projection that shows a state in which the required insulating film is cut from an insulating film roll body that is configured by winding a strip-shaped insulating film, FIG. 13(b) being an oblique projection that shows a state in which the insulating film that was cut in FIG. 13(a) is bent, FIG. 13(c) being an oblique projection that shows a state in which the insulating film from FIG. 13(b) is pushed from two sides using a mold to form the shape of the bent portion of the insulating film into a loop shape, and FIG. 13(d) being an oblique projection that shows a state in which a predetermined portion on the bent portion of the insulating film from FIG. 13(c) is bent and folded by heat pressing.

When manufacturing the inter-coil insulating body 10, the required insulating film is first cut as an insulating film segment 32 from an insulating film roll body 31 that is configured by winding a strip-shaped insulating film, as shown in FIG. 13(a). In this example, the shape of the insulating film segment 32 is a quadrangular shape (a rectangular shape).

Next, a bent portion 32a and a pair of facing portions 32b are formed by bending the insulating film segment 32, as shown in FIG. 13(b).

Next, as shown in FIG. 13(c), the shape of the bent portion 32a is formed into a loop shape by pressing the pair of facing portions 32b using a mold that holds the pair of facing portions 32b from two sides.

Next, as shown in FIG. 13(d), a heating apparatus 33 is pressed against a portion of the bent portion 32a while maintaining the state in which the pair of facing portions 32b are pressed by the mold from two sides to perform heat pressing on that portion of the bent portion 32a. Here, the heating apparatus 33 has: a heater 34; and an iron thermal block 35 that is heated by the heater 34. The thermal block 35 that has been heated by the heater 34 is pressed against that portion of the bent portion 32a.

Figure 14:
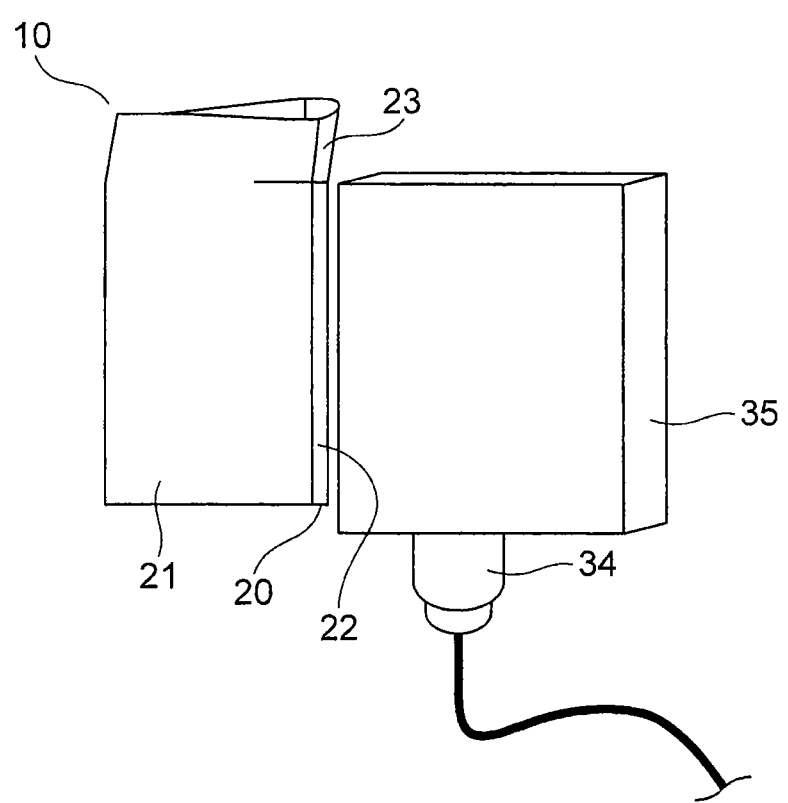
FIG. 14 is an oblique projection that shows a state in which formation of a bent portion by heat pressing using a heating apparatus from FIG. 13(d) is completed.

FIG. 14 is an oblique projection that shows a state in which formation of the bent portion 32a by heat pressing using the heating apparatus 33 from FIG. 13(d) is completed. As shown in FIG. 14, the portion of the bent portion 32a on which heat pressing is performed is bent and folded and is formed as the first inserted portion 22 by performing the heat pressing on the portion of the bent portion 32a while maintaining the state in which the pair of facing portions 32b are pressed by the mold from two sides, and a portion that is outside the heat pressing of the bent portion 32a remains as the second inserted portion 23 without being bent and folded. The pair of facing portions 32b are formed as the partitioning portions 21. Next, the inter-coil insulating body 10 is produced by removing the mold that presses the pair of facing portions 32b and the heating apparatus 33 from the insulating film segment 32.

In a rotary electric machine 1 and stator 3 of this kind, because the respective shapes of the visible outlines of the cross sections of the first and second inserted portions 22 and 23 that are continuous with each other are mutually different, and the first inserted portion 22 is insertable into the insertion groove 18 in a folded state, and the second inserted portion 23 generates a stronger elastic force of recovery than the first inserted portion 22 when the groove inserted portion 20 is inserted into the insertion groove 18, the groove inserted portion 20 can be easily inserted into the insertion groove 18 by inserting the first inserted portion 22 and the second inserted portion 23 sequentially into the insertion groove 18 consecutively. The inter-coil insulating bodies 10 can thereby easily be mounted into the stator core 7, enabling manufacturing of the stator 3 and the rotary electric machine 1 to be facilitated. The holding force on the groove inserted portion 20 inside the insertion groove 18 can be increased by the elastic force of recovery of the second inserted portion 23, enabling the inter-coil insulating bodies 10 to be more reliably mounted to the stator core 7. The inter-coil insulating bodies 10 can thereby be more reliably prevented from misaligning or dislodging relative to the stator core 7, enabling an insulated state among the plurality of stator coils 8 to be more reliably ensured.

Because the shape of the visible outline of the cross section of the second inserted portion 23 is an approximate C shape when the groove inserted portion 20 is outside the insertion groove 18, the second inserted portion 23 can be easily formed simply by bending the insulating film, and the elastic deformation of the second inserted portion 23 inside the insertion groove 18 can also be increased. The elastic force of recovery of the second inserted portion 23 when inserted inside the insertion groove 18 can thereby easily be increased.

Because the area that is surrounded by the shape of visible outline of the cross section of the second inserted portion 23 expands continuously away from the first inserted portion 22 when the groove inserted portion 20 is outside the insertion groove 18, the second inserted portion 23 can be housed inside the insertion groove 18 while the second inserted portion 23 is guided on the inner surface of the insertion groove 18 by inserting the second inserted portion 23 into the insertion groove 18 consecutively to the first inserted portion 22. The groove inserted portion 20 can thereby be inserted even more easily inside the insertion groove 18.

Because the maximum dimension of the second inserted portion 23 in the depth direction of the insertion groove 18 is greater than the maximum dimension of the first inserted portion 22 when the groove inserted portion 20 is outside the insertion groove 18, the elastic force of recovery of the second inserted portion 23 when inserted inside the insertion groove 18 can easily be made stronger than that of the first inserted portion 22.

Because the inter-coil insulating bodies 10 are formed by bending an insulating film that has a quadrangular shape, the shape of the insulating film can be prevented from becoming complicated, enabling manufacturing of the inter-coil insulating bodies 10 to be performed easily.

Because the first inserted portion 22 is formed by bending and folding the insulating film by heat pressing, the insulating film can be bent and folded in a short amount of time and more reliably, and the amount of age-related deformation due to springback of the insulating film can also be reduced. Inter-coil insulating bodies 10 that have stable shapes can thereby be manufactured easily.

Moreover, in the above example, the coil-core insulating bodies 9 are formed directly on the stator core 7 by molding, but coil bobbins that are formed in advance may be disposed on the stator core 7 as coil-core insulating bodies by respectively fitting each of the coil bobbins onto each of the magnetic pole tooth portions 12.

In the above example, the longitudinal dimension L1 of the first inserted portion 22 is greater than the longitudinal dimension L2 of the second inserted portion 23, but is not limited thereto, and the respective longitudinal dimensions L1 and L2 of the first inserted portion 22 and the second inserted portion 23 may be equal, or the longitudinal dimension L1 of the first inserted portion 22 may be smaller than the longitudinal dimension L2 of the second inserted portion 23.

The invention claimed is:

1. A rotary electric machine stator comprising:
   a stator core including:
      a tubular portion; and
      a plurality of magnetic pole tooth portions that are disposed so as to each protrude radially inward from the tubular portion so as to be spaced apart from each other in a circumferential direction of the tubular portion, the magnetic pole tooth portions surrounding an outer circumference of a rotor;
   a plurality of stator coils that are respectively disposed on the magnetic pole tooth portions;
   a coil-core insulating body that has a tubular portion overlapping portion that overlaps with an inner circumferential surface of the tubular portion, the coil-core insulating body ensuring an insulated state between the stator coil and the stator core; and
   an inter-coil insulating body that is formed by bending an insulating film, and that is disposed between the stator coils so as to ensure an insulated state between the stator coils,
   wherein:
   an insertion groove that is open toward a radially inner side of the stator core is disposed parallel to an axial direction of the stator core on the tubular portion overlapping portion;
   the inter-coil insulating body includes a groove inserted portion that generates an elastic force of recovery so as to be held inside the insertion groove by being inserted into the insertion groove parallel to a longitudinal direction of the insertion groove;
   the groove inserted portion includes:
      a first inserted portion that can be inserted inside the insertion groove from a longitudinal end portion of the insertion groove when the insulating film is in a bent and folded state; and a second inserted portion that is contiguous to the first inserted portion in a direction in which the groove inserted portion is inserted into the insertion groove, a shape of a visible outline of a cross section of the second inserted portion being different than that of the first inserted portion; and the second inserted portion generates a stronger elastic force of recovery than the first inserted portion when the groove inserted portion is inserted into the insertion groove.

2. The rotary electric machine stator according to claim 1, wherein the shape of the visible outline of the cross section of the second inserted portion is an approximate C shape when the groove inserted portion is outside the insertion groove.

3. The rotary electric machine stator according to either of claim 1, wherein an area that is surrounded by the visible outline of the cross section of the second inserted portion expands continuously away from the first inserted portion when the groove inserted portion is outside the insertion groove.

4. The rotary electric machine stator according to claim 1, wherein a maximum dimension of the second inserted portion is greater than a maximum dimension of the first inserted portion in a depth direction of the insertion groove when the groove inserted portion is outside the insertion groove.

5. The rotary electric machine stator according to claim 1, wherein the inter-coil insulating body is formed by bending the insulating film that has a quadrangular shape.

6. The rotary electric machine stator according to claim 1, wherein the first inserted portion is formed by bending and folding the insulating film by heat pressing.

7. A rotary electric machine comprising:
a rotor; and
a stator according to claim 1, the stator surrounding an outer circumference of the rotor.

* * * * *